(12) United States Patent
Chaten

(10) Patent No.: US 10,897,889 B2
(45) Date of Patent: Jan. 26, 2021

(54) VEHICLE WINCH GAME LOADER

(71) Applicant: Bobby Chaten, Little Rock, AR (US)

(72) Inventor: Bobby Chaten, Little Rock, AR (US)

(*) Notice: Subject to any disclaimer, the term of this patent is extended or adjusted under 35 U.S.C. 154(b) by 134 days.

(21) Appl. No.: 15/950,813

(22) Filed: Apr. 11, 2018

(65) Prior Publication Data
US 2018/0288997 A1    Oct. 11, 2018

Related U.S. Application Data

(60) Provisional application No. 62/484,114, filed on Apr. 11, 2017.

(51) Int. Cl.
| | | |
|---|---|---|
| *A01M 31/00* | (2006.01) | |
| *B66D 3/06* | (2006.01) | |
| *B60P 1/54* | (2006.01) | |
| *B66C 23/44* | (2006.01) | |
| *B66D 3/04* | (2006.01) | |

(52) U.S. Cl.
CPC ......... *A01M 31/006* (2013.01); *B60P 1/5471* (2013.01); *B66C 23/44* (2013.01); *B66D 3/043* (2013.01); *B66D 3/06* (2013.01)

(58) Field of Classification Search
CPC .... A01M 31/006; B60P 1/5471; B66C 23/44; B66D 3/06
USPC .................. 212/180; 254/325, 327; 414/462
See application file for complete search history.

(56) References Cited

U.S. PATENT DOCUMENTS

| | | | | |
|---|---|---|---|---|
| 2,967,635 A * | 1/1961 | Barnett | ................. | B60P 3/1016 |
| | | | | 414/462 |
| 3,478,908 A * | 11/1969 | Clark | .................... | B60P 3/1016 |
| | | | | 414/462 |
| 5,393,194 A * | 2/1995 | Smith | ....................... | B60P 1/00 |
| | | | | 212/298 |
| 5,662,451 A | 9/1997 | Muzzi et al. | | |
| 5,975,831 A | 11/1999 | Martin | | |
| 6,769,858 B1 * | 8/2004 | Butler | ................... | B60P 1/4421 |
| | | | | 414/462 |
| 7,296,959 B2 | 11/2007 | Davis | | |
| 7,544,032 B1 | 6/2009 | Scott | | |
| 7,549,545 B1 * | 6/2009 | Ashmore | ............ | A01M 31/006 |
| | | | | 212/180 |
| 7,896,604 B1 * | 3/2011 | Donlin | ..................... | B66D 1/00 |
| | | | | 212/180 |
| 9,783,398 B1 * | 10/2017 | Dartlon | ..................... | B60P 1/04 |
| 10,005,647 B2 * | 6/2018 | Anderson | ................ | B66D 1/36 |

(Continued)

*Primary Examiner* — James Keenan
(74) *Attorney, Agent, or Firm* — Boudwin Intellectual Property; Daniel Boudwin

(57) ABSTRACT

A vehicle winch game loader. The device includes a central support including a first pulley connected to an upper end thereof. A rear support is connected to the upper end of the central support. A front support includes a rear end connected to a lower end of the central support and a front end having a second pulley connected thereto. The front support extends in a direction opposite the rear support. A crossbar is connected to the lower end of the central support, wherein the crossbar is oriented perpendicular to the front support. A rear end of the rear support is configured to frictionally engage a rear end of a vehicle when the crossbar and the front support are supported on an upper surface of a front end of the vehicle. The device may be utilized to load game or other objects onto the vehicle using the vehicle's winch.

10 Claims, 4 Drawing Sheets

(56) References Cited

U.S. PATENT DOCUMENTS

2006/0182571 A1\* 8/2006 Hightower ............ B60P 1/5471
　　　　　　　　　　　　　　　　　　　　　　414/466
2006/0280584 A1\* 12/2006 Spuzak .................. B66C 23/44
　　　　　　　　　　　　　　　　　　　　　　414/462

\* cited by examiner

VEHICLE WINCH GAME LOADER

CROSS REFERENCE TO RELATED APPLICATIONS

This application claims the benefit of U.S. Provisional Application No. 62/484,114 filed on Apr. 11, 2017. The above identified patent application is herein incorporated by reference in its entirety to provide continuity of disclosure.

BACKGROUND OF THE INVENTION

The present invention relates to game loaders and lifters. More specifically, the present invention provides a vehicle winch game loader that is configured to freely rest on a vehicle and utilize the vehicle's winch to load game or other objects onto a deck of the vehicle.

Many individuals utilize all-terrain vehicles (ATVs) for work or recreational purposes. ATVs and other similar utility vehicles typically include a rear deck which can support cargo for transport. However, it can be difficult for a single individual to lift large or heavy objects onto the rear deck by themselves. For example, individuals that hunt game such as deer often wish to load the game onto their ATV, but it can be very difficult to lift and load a game animal without help from others. Individuals may injure themselves when attempting to load the ATV. Without additional assistance, a game animal or other heavy object may have to be left behind. In order to address these concerns, it is desirable to provide a vehicle winch terrain loader that utilizes a vehicle's winch to easily load game or other objects onto the vehicle.

Devices have been disclosed in the known art that relate to game lifters and loaders for vehicles. These include devices that have been patented and devices that have been disclosed in published patent applications. However, these devices have several drawbacks. For example, the devices in the known art must be secured or fastened to a vehicle prior to operation, which can be a difficult and time-consuming task. Additionally, the lifting devices in the known art are typically large and bulky, which makes them difficult to store or transport.

In light of the devices disclosed in the known art, it is submitted that the present invention substantially diverges in design elements from the known art and consequently it is clear that there is a need in the art for an improvement to existing animal deterring devices. In this regard the instant invention substantially fulfills these needs.

SUMMARY OF THE INVENTION

In view of the foregoing disadvantages inherent in the known types of game loaders and lifters now present in the prior art, the present invention provides a vehicle winch game loader wherein the same can be utilized for providing convenience for the user when lifting game or other cargo onto a vehicle for transport. The present vehicle winch game loader includes a central support including a first pulley connected to an upper end thereof. A rear support is connected to the upper end of the central support. A front support includes a rear end connected to a lower end of the central support and a front end having a second pulley connected thereto. The front support extends in a direction opposite the rear support. A crossbar is connected to the lower end of the central support, wherein the crossbar is oriented perpendicular to the front support. A rear end of the rear support is configured to frictionally engage a rear end of a vehicle when the crossbar and the front support are supported on an upper surface of a front end of the vehicle.

One object of the present invention is to provide a vehicle winch game loader that includes all of the advantages of known art devices and none of the disadvantages.

Another object of the present invention is to provide a vehicle winch game loader that may be utilized to automatically load game or other objects onto a vehicle using the vehicle's winch.

A further object of the present invention is to provide a vehicle winch game loader that does not require fastening to the vehicle to function properly.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
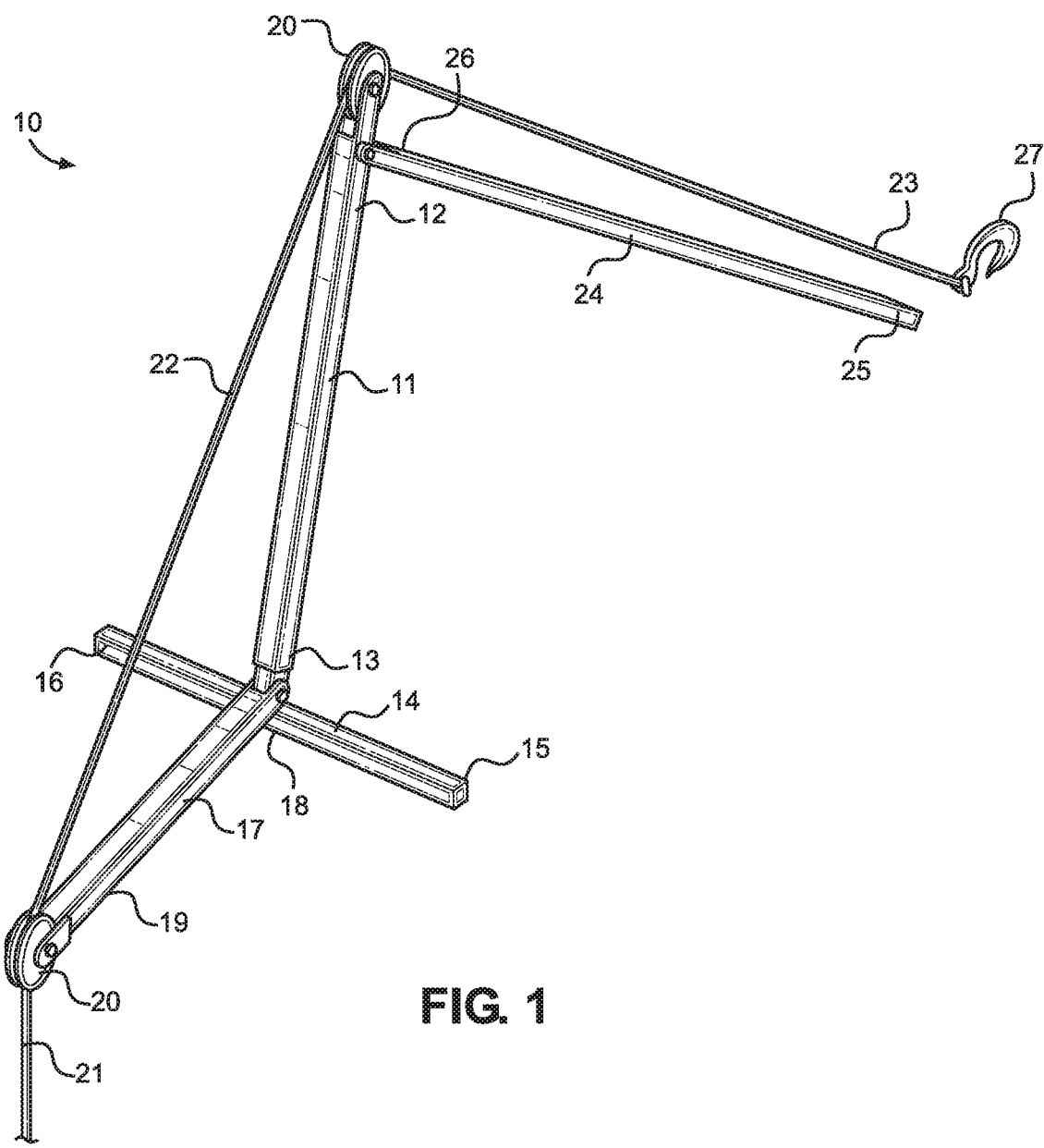
FIG. 1 shows a front perspective view of vehicle winch game loader.

Reference is made herein to the attached drawings. Like reference numerals are used throughout the drawings to depict like or similar elements of the vehicle winch game loader. For the purposes of presenting a brief and clear description of the present invention, the preferred embodiment will be discussed as used for loading game or other cargo onto a vehicle. The figures e intended for representative purposes only and should not be considered to be limiting in any respect.

Figure 2:
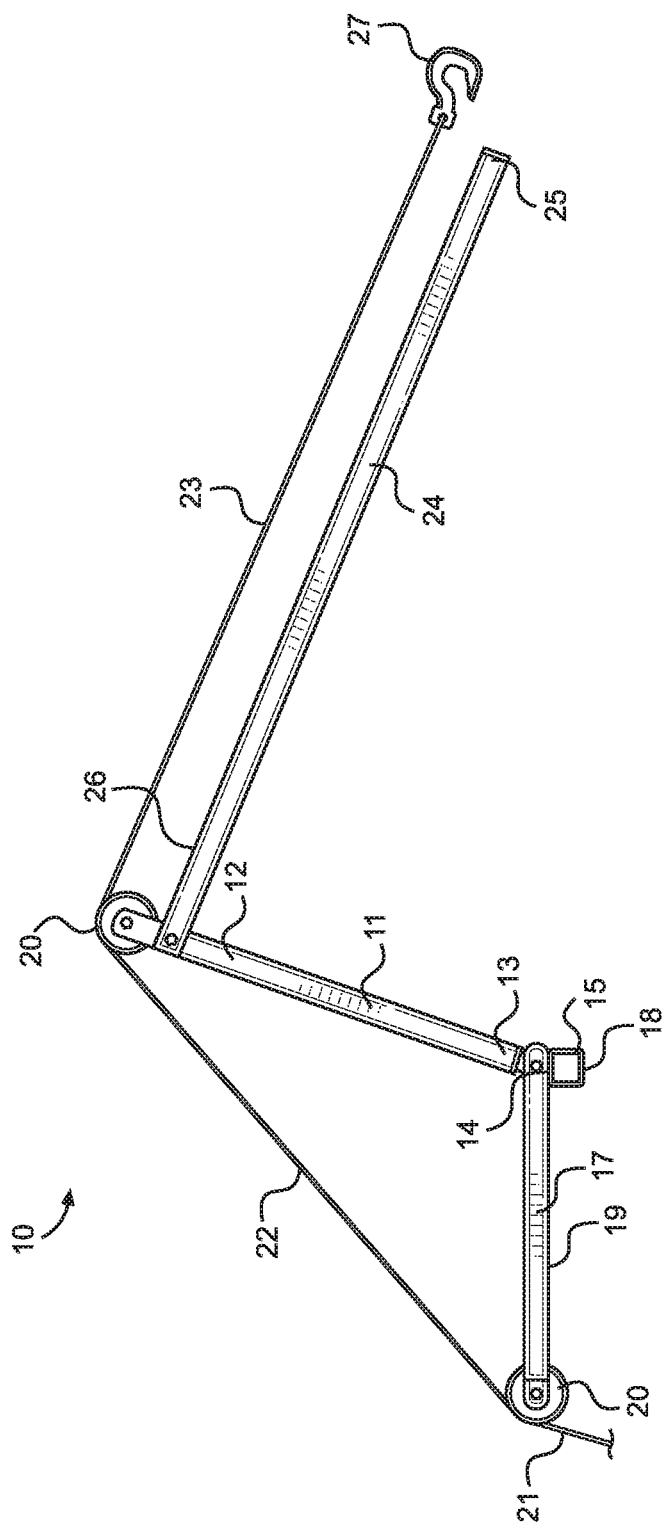
FIG. 2 shows a side view of the vehicle winch game loader.

Referring now to FIGS. 1 and 2, there is shown a front perspective view of the vehicle winch game loader and a side view of the vehicle winch game loader, respectively. The vehicle winch game loader 10 includes a central support 11 having an upper end 12 and a lower end 13. A front end 26 of a rear support 24 is connected to the upper end 12 of the central support 11. The rear support 24 extends outwardly and downward from the central support 11 at an angle. The rear end 25 of the rear support 24 is configured to frictionally engage an upper portion of the vehicle. A front support 17 includes a rear end 18 connected to the lower end 13 of the central support 11.

Figure 3:
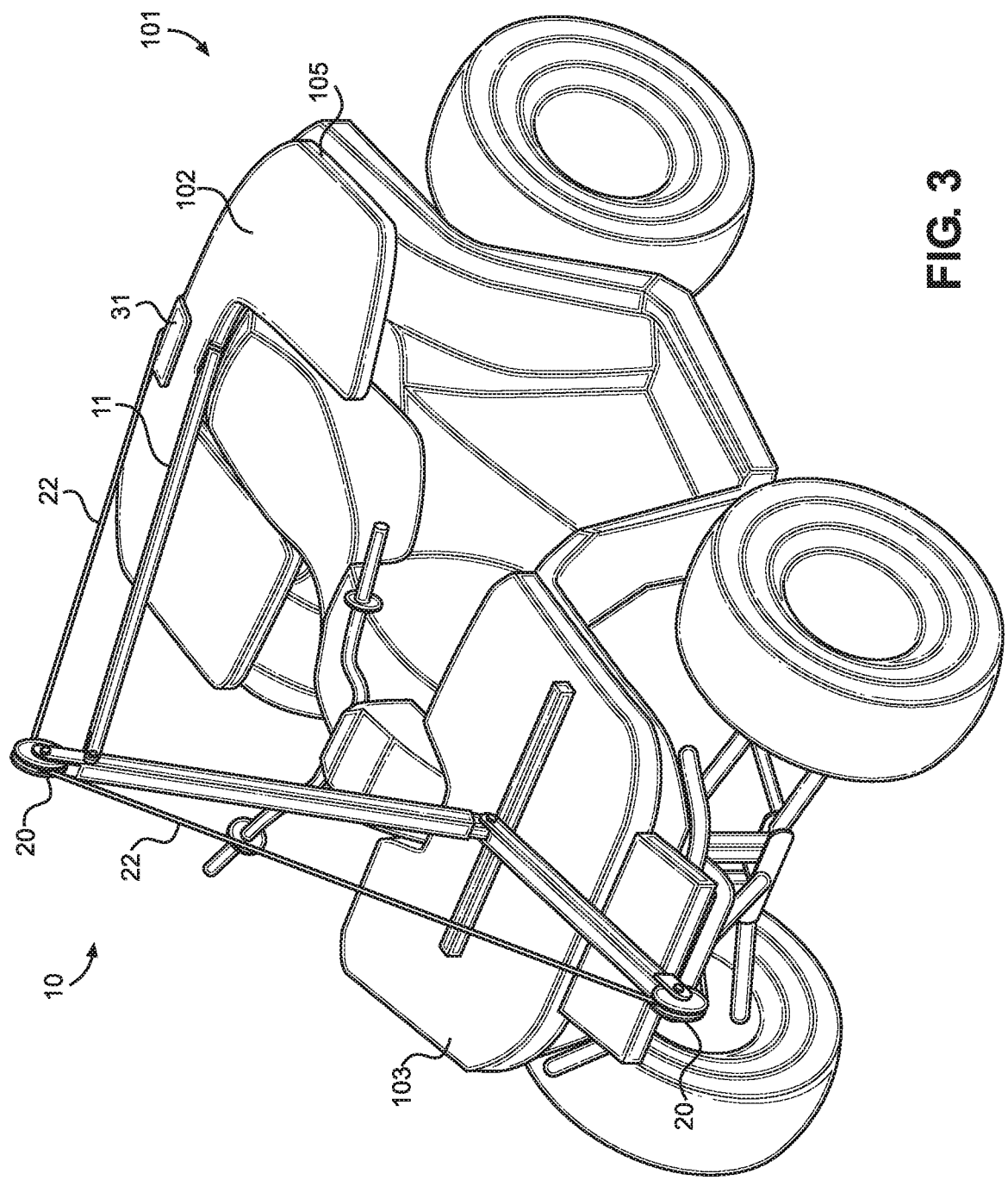
FIG. 3 shows a front perspective view of the vehicle winch game loader in use with an all-terrain vehicle.
Figure 4:
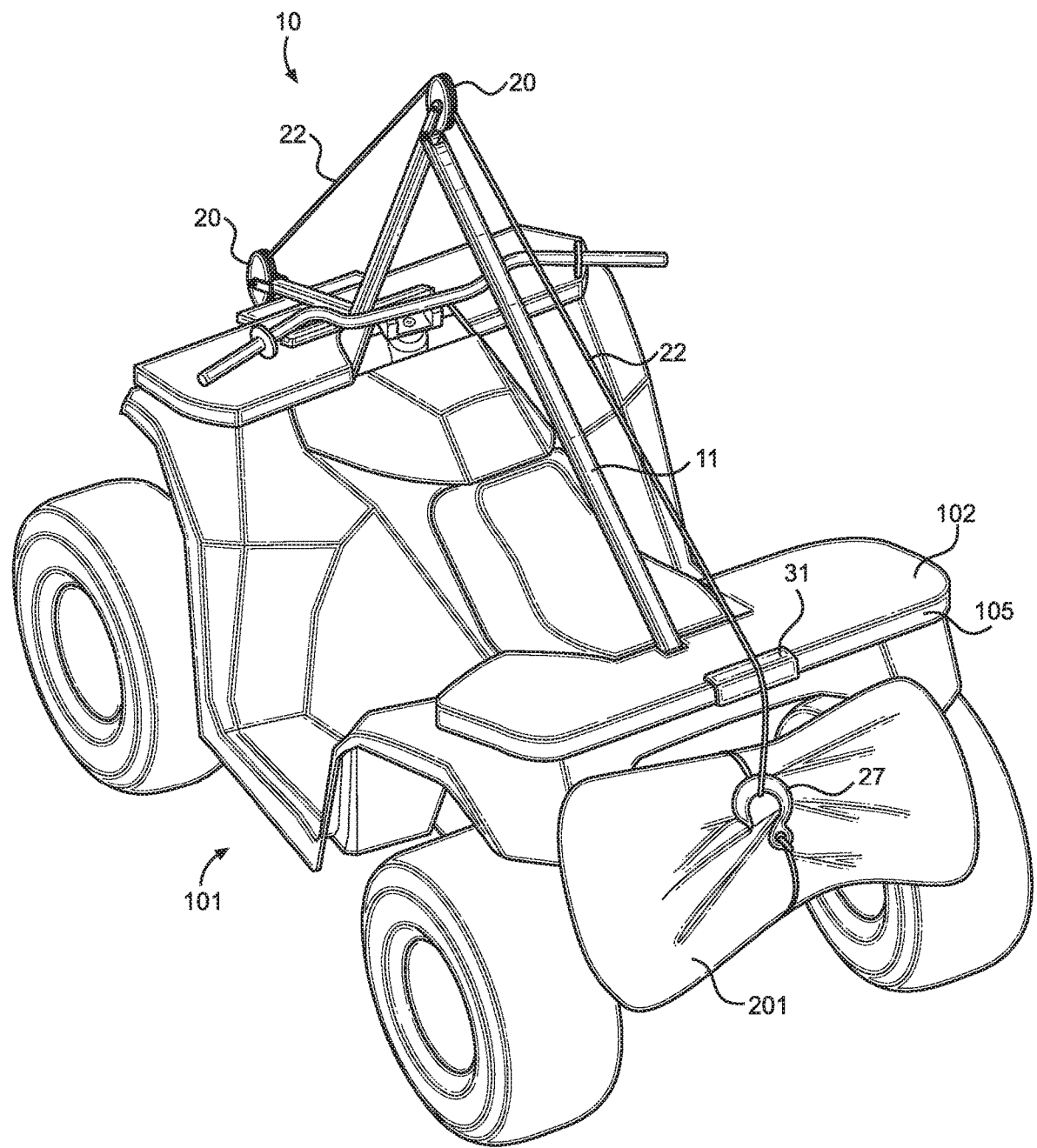
FIG. 4 shows a rear perspective view of the vehicle winch game loader in use with an all-terrain vehicle.

In an exemplary use of the vehicle winch game loader 10, the front support 17 rests on a front deck of a vehicle, and the rear support 25 rests on a rear deck of the vehicle, as shown in FIGS. 3 and 4. The vehicle winch game loader 10 further includes a crossbar 14 connected to the lower end 13 of the central support 11. The crossbar 14 provides lateral support to the vehicle winch game loader 10 when it is supported on a vehicle. In the shown embodiment, the central support 11 connects to a midpoint of the crossbar 14, such that the opposing ends 15, 16 of the crossbar 14 extend from opposing sides of the central support 11 in equal lengths. This positioning of the crossbar 14 provides for the maximum amount of lateral support.

A first pulley 20 is connected to the upper end 12 of the central support 11, and a second pulley 20 is connected to a front end 19 of the front support 17. Each pulley wheel is configured to spin freely. A cable 22 is supported by the pulleys 20. A first end 21 of the cable 22 is configured to connect to a winch, and a second end 23 of the cable 22 includes a connector 27 thereon. In the shown embodiment, the connector 27 comprises a hook. In alternate embodiments, alternate connectors 27 may be utilized, such as a clamp, bracket, fastening mechanism, or the like.

Referring now to FIG. 3, there is shown a front perspective view of the vehicle winch game loader in use with an all-terrain vehicle 101. The front support 17 and the crossbar 15 are supported on a front deck 103 of the ATV 101, while the rear end 25 of the rear support 24 and frictionally engages a rear deck 102 of the ATV. The rear support 24 can rest within an indentation on the rear deck 102, or can otherwise be retained on the rear deck 102 via friction. In either scenario, frictional engagement between the rear deck 102 and the rear support 24 keeps the vehicle winch game loader in place during operation, such that no additional fastening mechanisms are required to secure the vehicle winch game loader to the ATV.

Referring now to FIG. 3, there is shown a front perspective view of the vehicle winch game loader in use with an all-terrain vehicle 101. The front support 17 and the crossbar 15 are supported on a front deck 103 of the ATV 101, while the rear end 25 of the rear support 24 frictionally engages a rear deck 102 of the ATV. The rear support 24 can rest within an indentation on the rear deck 102, or can otherwise be retained on the rear deck 102 via friction. In either scenario, frictional engagement between the rear deck 102 and the rear support 24 keeps the vehicle winch game loader in place during operation, such that no additional fastening mechanisms are required to secure the vehicle winch game loader to the ATV.

The cable 22 is affixed to a winch installed on the front end of the ATV 101 beneath the front deck 103. For vehicles that include a winch on a rear end thereof, the vehicle winch game loader can be reoriented such that the rear support 24 engages the front deck 103 and the front support 17 engages the rear deck 102. In the shown embodiment, the length of the rear support 24 is greater than the length of the front support 17, which allows the rear support 24 to extend past the ATV's seat and rest on the rear deck 102.

Referring now to FIG. 4, there is shown a rear perspective view of the vehicle winch game loader in use with an all-terrain vehicle. In the shown embodiment, the vehicle winch game loader is used with an all-terrain vehicle (ATV) 101. When the winch is activated to retract the cable 22 and raise an attached object 201, the tension in the cable 22 is distributed by the pulleys 20 such that a downward force is applied to the vehicle winch game loader, holding it in place on the ATV 101 without any additional fasteners.

In the illustrated embodiment, the connector comprises a hook 27 that is pivotally connected to the cable 22, such that the orientation of the hook 27 can be easily adjusted when securing the hook 27 and cable 22 around a cargo 201 to be loaded. In operation, the cable 22 can be wrapped around a cargo 201 to be loaded onto the ATV 101 and the hook 27 attached to the cable, such that the cable 22 forms and maintains a loop around the cargo 201. The cargo 201 may be a game animal, tree limb, camping supplies, or any other type of object or objects that an individual wishes to transport on the ATV 101.

In the shown embodiment, the vehicle winch game loader further includes a spacer 31. The spacer 31 is configured to removably secure to a rear edge 105 of the rear deck 102 via frictional engagement therewith. The spacer 31 prevents the cable 22 or cargo 201 from scraping and potentially damaging the rear deck 102 or other rear portions of the ATV. In the illustrated embodiment, the spacer 31 includes a curved outer surface. The curved outer surface of the spacer 31 allows the cable 22 to more easily slide thereon when lifting the attached cargo 201. Overall, the vehicle winch game loader is configured to rest on the ATV 101 and provide a means for raising cargo 201 onto the ATV 101 for transport utilizing the vehicle's winch.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle winch game loader in combination with an ATV, comprising:
    a central support including a first pulley connected to an upper end thereof;
    a rear support connected to the upper end of the central support;
    a front support including a rear end connected to a lower end of the central support and a front end having a second pulley connected thereto;
    the ATV including a front deck positioned on a front section of the ATV;
    wherein the front deck is longitudinally spaced from a rear deck located on a rear portion of the ATV;
    wherein an operator's seating area is located between the front and rear decks;
    wherein the second pulley extends past the front deck of the ATV;
    wherein the front support extends in a direction opposite the rear support;
    and a crossbar connected to the lower end of the central support, wherein the crossbar is oriented perpendicular to the front support; and
    wherein the cross bar and the front support are supported on the front deck of the ATV and a rear end of the rear support is configured to frictionally engage the rear deck of the ATV.

2. The vehicle winch game loader of claim 1, further comprising:

a cable supported by the first pulley and the second pulley, the cable including a first end secured to a winch and a second end having a connector thereon.

3. The vehicle winch game loader of claim 2, wherein the first end of the cable is removably secureable to the winch.

4. The vehicle winch game loader of claim 2, wherein the connector is configured to secure to the cable such that a loop is formed around an object to be lifted onto the vehicle.

5. The vehicle winch game loader of claim 2, wherein the connector comprises a hook.

6. The vehicle winch game loader of claim 5, wherein the hook is pivotally connected to the second end of the cable.

7. The vehicle winch game loader of claim 1, further comprising a spacer configured to removably and frictionally engage an edge of the rear end of the vehicle.

8. The vehicle winch game loader of claim 7, wherein the spacer comprises a curved outer surface.

9. The vehicle winch game loader of claim 1, wherein a length of the rear support is greater than a length of the front support.

10. The vehicle winch game loader of claim 1, wherein the front support is connected to the crossbar at a midpoint of the crossbar.

\* \* \* \* \*